United States Patent [19]

Ng et al.

[11] Patent Number: 5,087,981
[45] Date of Patent: Feb. 11, 1992

[54] ERROR DIFFUSION OF OVERLAPPING DOTS

[75] Inventors: Yee S. Ng, Fairport; Hwai T. Tai, Rochester, both of N.Y.

[73] Assignee: Eastman Kodak Company, Rochester, N.Y.

[21] Appl. No.: 459,492

[22] Filed: Jan. 2, 1990

[51] Int. Cl.⁵ ............................................. H04N 1/40
[52] U.S. Cl. ..................................... 358/459; 382/50; 358/461
[58] Field of Search ................. 358/463, 461, 459; 382/50

[56] References Cited

U.S. PATENT DOCUMENTS

| | | | |
|---|---|---|---|
| 4,651,228 | 3/1987 | Koch | 358/298 |
| 4,654,721 | 3/1987 | Goertzel et al. | 358/283 |
| 4,680,645 | 7/1987 | Dispoto et al. | 358/298 |
| 4,891,714 | 1/1990 | Klees | 358/456 |

OTHER PUBLICATIONS

Hunt, *The Reproducing of Colour in Photography, Printing & Television*, 1987, pp. 69-73, 114-123 and 264-265.
Lama et al., "Hybrid (Gray Pixel) Halftone Printing," *Journal of Imaging Technology*, vol. 15, No. 3, Jun. 1989, pp. 130-135.

*Primary Examiner*—Leo H. Boudreau
*Assistant Examiner*—Andrew W. Johns
*Attorney, Agent, or Firm*—Norman Rushefsky

[57] ABSTRACT

Method and apparatus for converting gray-scale pixel information into data for rendering dots by a printer, video display, or similar device. A form of error diffusion is used wherein a thresholding error produced during the conversion process for a particular dot is propagated to one or more adjacent dots. The propagated error modifies the comparisons made for the adjacent dots and can be converted into lightness space to linearize the error. The error itself is modified when there is overlap of the propagating dot with an adjacent dot. The overlap modification is dependent upon the density levels being rendered and the amount of overlap between the dots.

20 Claims, 4 Drawing Sheets

FIG. 1
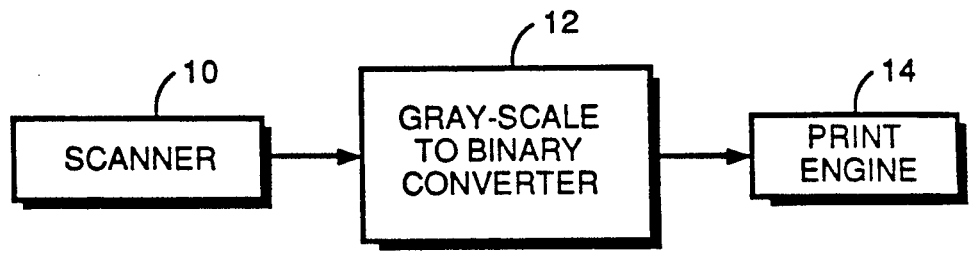
FIG. 2
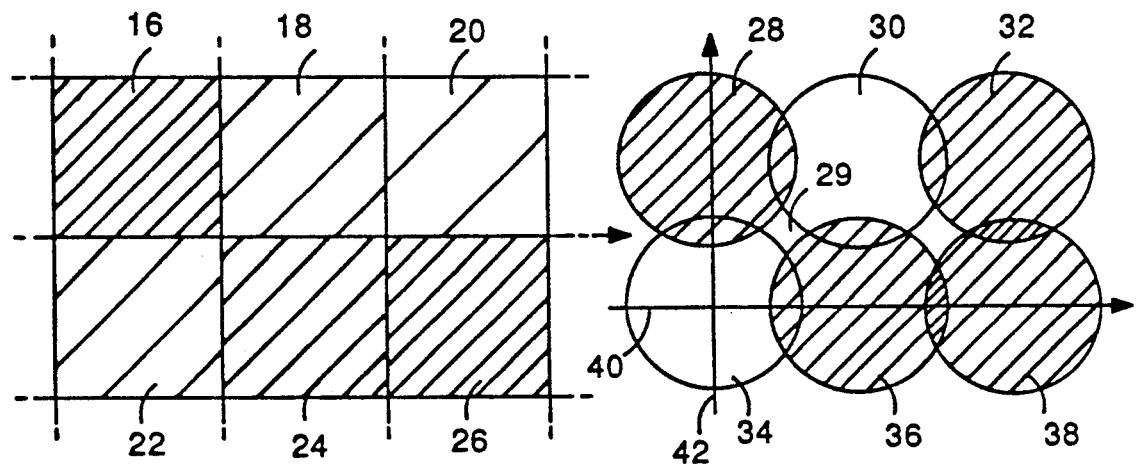
FIG. 3
FIG. 4
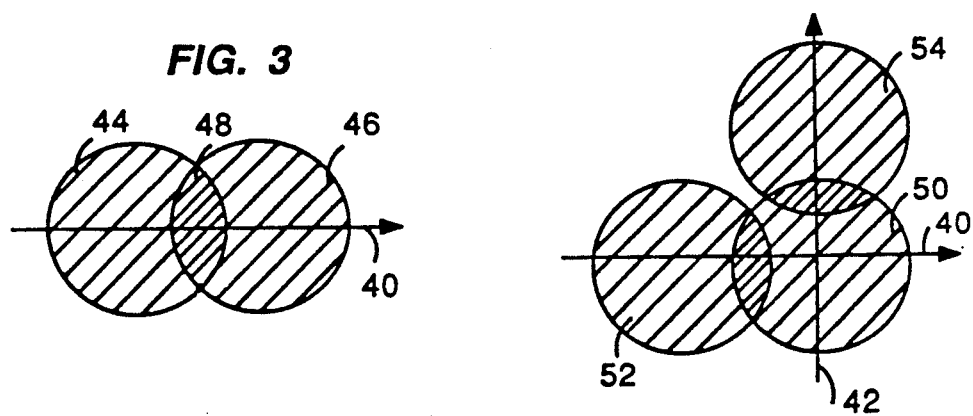

FIG. 5
| PROPAGATING DOT LEVEL | ADJACENT DOT LEVEL | PROPAGATED ERROR MODIFIED? |
|---|---|---|
| 0 | 0 | NO |
| 0 | 1 | NO |
| 1 | 0 | YES |
| 1 | 1 | YES |
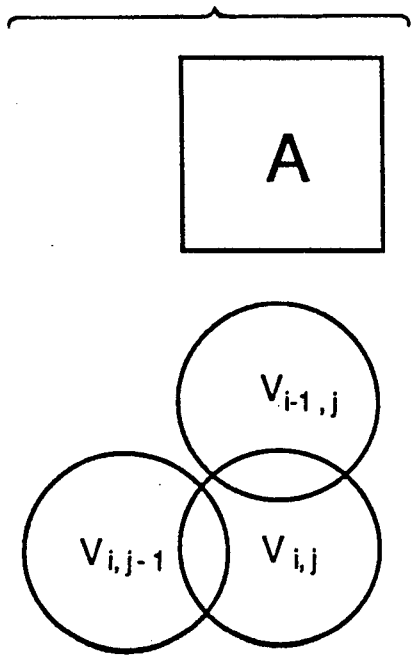
FIG. 6
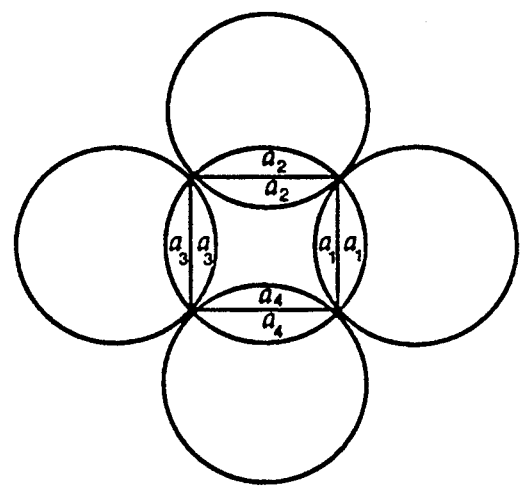
FIG. 7

1

ERROR DIFFUSION OF OVERLAPPING DOTS

BACKGROUND OF THE INVENTION

1. Field of the Invention

This invention relates, in general, to pictorial communications and, more specifically, to apparatus and methods for converting gray-scale pixel information into binary printing data.

2. Description of the Prior Art

Various types of printing or rendering systems are used to reproduce an image on a viewable medium, such as a sheet of paper. Typically, the rendering device produces a large number of pixels or dots which, when viewed at a normal distance without magnification, produce the desired image. Using gray-scale or gray-level dot renderings increases the ability of the rendered image to closely match the desired image, which may be a copy of a continuous tone picture being produced on a copy machine having an electronic scanner. However, true gray-level rendering requires special types of apparatus and demands a large amount of memory for high quality outputs, especially when color is being used.

Several techniques have been used according to the prior art to produce information which has gray-level content on apparatus which is not capable of printing true gray-levels. While not all encompassing of the methods available, error diffusion and halftoning are frequently used when it is desired to render perceivable levels of gray by a rendering device which can only produce dots having two levels, such as a binary printer. With error diffusion, the dots are rendered based upon a thresholding process which changes the corresponding pixel data depending upon what happened in a previous thresholding process. If the error-corrected pixel data is above the threshold, it is printed in one of the binary levels, such as full black. If the pixel data is below the threshold, it is printed in the other binary level, or white (no print). The density difference between the binary dot and the gray-level pixel data is considered an error since the dot is usually not exactly the same gray-level as the original pixel. This error is propagated to subsequent pixel-dot comparisons to alter those comparisons either by changing the gray-level pixel data or the threshold level. By using this technique, a better rendering of the gray-levels in the pixel information can be made than could be accomplished by simply thresholding on a one-to-one basis for each pixel and rendered dot.

Halftoning uses the perceivable gray-level produced by several rendered dots grouped together in a cell. Normally, the individual dots have only two levels of density. The overall gray-level of the cell is near to the gray-level for the corresponding pixel in the input information. This approach uses binary dots to form the gray-levels, but the resolution of the rendered image can suffer unless more dots can be rendered for each pixel of data. In any event, such a system requires a considerable amount of image processing and a relatively high resolution rendering device to produce high quality images.

Some techniques use a combination of both systems to achieve the desired result. U.S. Pat. No. 4,680,645, issued on July 14, 1987, discloses a system whereby gray-level dots are effectively produced by varying the size of the dots. Large dots are used when the density of the pixel is high. When the density is low, small dots are rendered. In this patent, the number of discrete gray-levels which can be produced by the dots is less than the number of gray-levels included in the original pixel information. Therefore, a type of error diffusion is used to determine the size of subsequent dots. This patent also recognizes that adjacent dots may overlap when they are rendered at or near to the maximum size. However, the error diffusion method disclosed therein does not prevent this nonlinearity, although the patent indicates that performing the calculations in optical density units, which are more observer related, will yield better images devoid of nonlinear artifacts. See column 2, line 65, to column 3, line 16, of the patent.

U.S. Pat. No. 4,654,721, issued on Mar. 31, 1987, discloses a system whereby halftone cells are created based upon the gray-level of the corresponding pixel in the data. When the gray-level represented by the halftone cell is different from the gray-level pixel value, an error is propagated or diffused to at least two other halftone cells. The basic method of rendering disclosed in this patent does not present itself with the problems associated with overlapping dots which the present invention recognizes and solves.

An important problem with rendering devices which can produce dots which are overlapping other dots is that conventional error diffusion techniques assume that the dots do not overlap. In determining the amount of error which will influence the thresholding operation of an adjacent dot, no consideration is given to the fact that the dots may overlap in conventional error diffusion. For example, in the case where two adjacent dots overlap by 20 percent of their area, the resulting error diffused from one dot to the other dot can be incorrect by as much as 20 percent, depending upon the binary level rendered for the dots.

Therefore, it is desirable, and it is an object of this invention, to provide a method and apparatus for converting gray-level pixel information into binary printing data which compensates for the overlap between adjacent dots rendered on the output medium.

SUMMARY OF THE INVENTION

There is disclosed herein a new and useful system for converting gray-scale pixel information at one level into binary or gray-scale data at a lower level which can be rendered with dots produced by a print engine, video display, or similar device. The system modifies the thresholding step performed by conventional error diffusion techniques by taking into consideration the overlapping areas between adjacent dots and the density level of the adjacent dots.

According to a specific embodiment of the invention wherein gray-scale information is converted into binary dots, the current pixel data value is modified according to the amount of overlap between the dot being thresholded and a previous dot when the previous dot is at a binary 1 or at the full black level. When the previous dot is at a binary 0, or white level, no modification to the current pixel data value is made. The same process is applied to both horizontal and vertical dots which are adjacent to the dot being thresholded.

By use of this technique, and by linearizing the diffused error by converting it into lightness space, an improved rendering of the image represented by the pixel information can be achieved.

BRIEF DESCRIPTION OF THE DRAWINGS

Further advantages and uses of this invention will become more apparent when considered in view of the following detailed description and drawings, in which:

FIG. 1 is a block diagram of a copier constructed to use the invention;

FIG. 2 is a diagram illustrating the relationship between gray-level input pixel information and the corresponding rendered binary dots;

FIG. 3 is a diagram illustrating overlap between horizontally adjacent dots;

FIG. 4 is a diagram illustrating overlap between horizontally and vertically adjacent dots;

FIG. 5 is a table illustrating when the propagated error is modified according to this invention;

FIGS. 6 and 7 illustrate the relationship between the mathematical nomenclature used for the pixels and dots;

DESCRIPTION OF THE PREFERRED EMBODIMENTS

Figure 8:
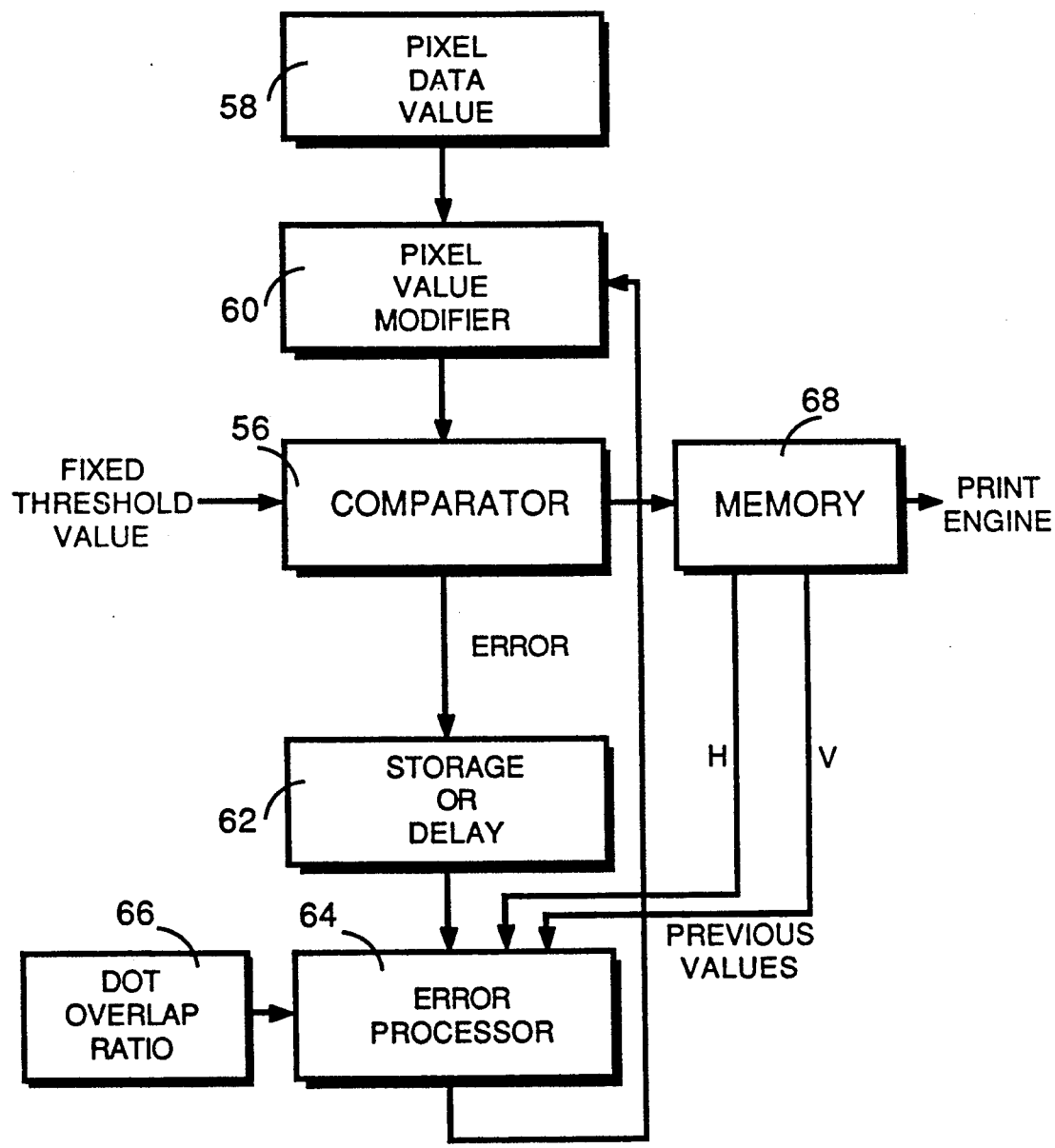
FIG. 8 is a block diagram of apparatus used to perform the error diffusion taught by this invention.

Throughout the following description, similar reference characters refer to similar elements or members in all of the figures of the drawings.

Referring now to the drawings, and to FIG. 1 in particular, there is shown a basic block diagram of a copy machine constructed to use the invention. The copy machine includes the electronic scanner 10 which inputs the information content of the original document. This information is transferred to the gray-scale to binary converter 12 which processes the input information and puts it into the proper form for use by the print engine 14, which is assumed to be a binary rendering device. It is emphasized that the invention disclosed herein is also applicable to rendering devices which can produce gray-level dots. In any event, the converter 12 converts pixel information from the scanner 10 at one gray-level into data which is to be rendered at a different and smaller gray-level, with the extreme case of the latter gray-level being binary.

FIG. 2 is a diagram which illustrates the correlation between the input pixel information and the corresponding dots rendered by a binary print engine. Pixels 16, 18, 20, 22, 24 and 26 represent discrete areas on the original document which have distinct density levels which can be read and quantitized by the scanner 10. Of course, there would usually be many more pixels in the scan information than the six shown in FIG. 2 for illustrative purposes. As depicted, pixels 16 and 26 are more dense or darker than any of the other pixels. Pixel 24 is the next dense pixel and pixel 20 is the lightest pixel. Pixels 18 and 20 have an intermediate density level. The electrical information provided by this pixel information is processed by the converter 12 to establish data which will produce the output dots 28, 30, 32, 34, 36 and 38 when rendered by a suitable binary print engine. Although shown as square, the pixels of the scanned information could have other shapes depending upon the configuration of the scanning sensor, which can be a CCD device. In addition, the pixel information may be derived from another source other than a scanner. For example, it may be page description information which is produced at a remote terminal or work station.

The rendered dots 28-38 are illustrated as being completely circular. In some apparatus, the dots may be eliptical or have other shapes, although the shape of the rendered dots is usually constant throughout the page of rendered data. Because of the size of the rendered dots, voids or gaps 29 exist between the dots illustrated in FIG. 2. The invention is also applicable to the preferred case where the dots are large enough to eliminate the gap 29. In binary systems, the diameter of the dots is usually 1.2 to 1.4 times the pitch between the pixels.

The rendered data can be produced by a print engine which produces the dots on a hard copy medium, such as paper, or other rendering device, such as a video display. In a video display, the phosphorous elements activated by the electron beam are usually separated from each other. This is also the case with electroluminescent and liquid crystal displays. However, when the image is projected onto the front screen by the electron beam, the individual dots look larger than the separate elements and merging or overlapping of the dots takes place. One of the important things to note in the representation of the rendered data dots by whatever device is the fact that the dots may overlap each other in one of or in both of the horizontal and vertical directions, 40 and 42, respectively.

Since a binary rendering system is being described in this specific embodiment, the dots are represented as being either completely printed, or in full black, such as dots 28, 32, 36 and 38, or as being not printed, or in white, such as dots 30 and 34. The decision as to whether the dots will be printed or not in black, or other color, depends upon the pixel information and the error diffusion algorithm used in processing the pixel information, as well as the threshold value used for comparison. Rarely will there be a direct correspondence between the pixel information and the rendered dots as far as the density of the dots is concerned. To emphasize this, dot 32 is shown as black whereas the corresponding pixel 20 is shown with a relatively low density. However, the error diffusion technique or algorithm used in determining which binary level to print for the dots in the rendered data has modified a simple thresholding process of the pixel information to influence the binary level selected for the dots depending upon errors yielded during previous thresholding operations. Thus, the apparent difference between pixel 20 and dot 32 is explained. The important element to remember is that the rendered dot data according to this invention corresponds to the input pixel information based upon an error diffusion technique which takes into consideration a thresholding value and a modification of the input pixel value based upon the error of the previously rendered adjacent dot, the overlap, and the density level of adjacent dots.

Although error diffusion has been used in the prior art to produce dot data, there is a certain amount of error associated with the error diffusion process when the rendered dots overlap under certain conditions. FIG. 3 illustrates the overlapping of two adjacent dots along the horizontal axis 40. Dots 44 and 46 are rendered as black dots and have the common area 48 overlapping each other. It is the common area, or overlapped area 48, which causes incorrect errors to be propagated by conventional error diffusion systems.

A typical example of binary error diffusion will be used to describe the incorrect error produced by using conventional error diffusion techniques. In FIG. 3, dot 46 corresponds to a pixel which has a gray-level of 150, assuming that black equals 255 and that white equals 0. By normal thresholding, a fixed threshold value of 128 would require that the dot 46 be rendered in black. Since the corresponding pixel for dot 46 is actually at a gray-level of 150 and the dot is printed at a level of 255, an error of 105 will be propagated to one or more pixels yet to be thresholded. However, since dot 44 was already black, the only area of the dot 46 which contributed to additional black on the rendered page is the area outside the common area 48. Thus, the error of 105 which is propagated to other dots, according to conventional error diffusion techniques, is too high. The invention herein reduces the propagated error by an amount corresponding to the area overlap between the dots. If the dots could be rendered in more than two levels, multiple threshold values would be used in determining the errors.

FIG. 4 is a diagram which illustrates dot overlap between both horizontally and vertically adjacent dots. In this case, dot 50 has an overlapping area with both dots 52 and 54. Both of these overlaps affect the determination of an error calculated by the error diffusion technique when the propagating dots, or dots 52 and 54, are black. It is emphasized that the propagation of the error produced by the diffusion technique may extend beyond the dot immediately adjacent to the dot which propagates the error. In some cases, the amount of the error may be weighted to certain other dots downstream from the propagating dot according to the specific error diffusion technique being used. In addition, according to this invention, the incorrect error may be compensated for either at the time the error is propagated or at the time the error is being used to determine a threshold or level modification. Whatever the specific error diffusion technique being employed, it is still necessary to take into consideration the common overlap area between dots to more accurately propagate any errors which occur during the thresholding process.

The modification of the error is necessary, according to this invention, only when the level of the propagating dot is black or, for a binary system, a binary 1. This applies whether the propagating dot is either vertically above or horizontally to the side of the adjacent dot. In other words, when the propagating dot is 0, there will be no common black area of overlap between the propagating dot and the adjacent dot to which the error is propagated. Therefore, no modification is needed in the propagated error. However, as previously described, when the propagating dot level is black or a binary 1, a part of its area influences the rendered level of the adjacent, whether that dot is calculated to be a binary 0 or a binary 1. Therefore, whenever the propagating dot level is a binary 1, the error propagated by that dot is modified according to this invention. FIG. 5 is a table which illustrates and summarizes the conditions under which the error must be modified to eliminate the discontinuities produced by overlapping of adjacent dots in the rendered image.

With the aid of the illustrations in FIGS. 6 and 7, the relationship between the pixel data, errors, and dot renderings can be defined mathematically as:

$$V_{i,j} = V_{i,j,b} - E_{i,j-1} * C_1 - E_{i-1,j} * C_2 \quad (1)$$

where $$E_{i,j} = B - V_{i,j} \text{ if } V_{i,j} > V_{threshold} \quad (2)$$

and $$E_{i,j} = W - V_{i,j} \text{ if } V_{i,j} < V_{threshold} \quad (3).$$

In equation (1):
  $V_{i,j}$ is the value of the pixel in the i th row and j th column after correction for the errors propagated from adjacent pixels;
  $V_{i,j,b}$ is the value of the dot at the i th row and j th column before correction by the propagating error;
  $E_{i,j-1}$ is the error propagated from the pixel in i th row and (j−1) th column;
  $C_1$ is the percentage of error propagated from the pixel in the i th row and the (j−1) th column to the pixel in the i th row and the j th column;
  $E_{i-1,j}$ is the error propagated from the pixel in the (i−1)th row and the j th column; and
  $C_2$ is the percentage of error propagated from the pixel in the (i−1)th row and the j th column to the pixel in the i th row and j th column.

In equations (2) and (3):
  $E_{i,j}$ is the error that is acquired in the pixel at the i th row and j th column when B or W is chosen as the output for that pixel.

In equation (1):

$$B = 255[1 + a_1/A(a_1) + a_2/A(a_2) + a_3/A(a_3) + a_4/A(a_4)] \quad (4)$$

and W=0, where:
  $a_1 = 1$ if there is no overlap for region 1
  $a_1 = -1$ if there is dot overlap for region 1
  $a_2 = 1$ if there is no overlap for region 2
  $a_2 = -1$ if there is dot overlap for region 2
  $a_3 = 1$ if there is no overlap for region 3
  $a_3 = -1$ if there is dot overlap for region 3
  $a_4 = 1$ if there is no overlap for region 4
  $a_4 = -1$ if there is dot overlap for region 4.

The preceding analysis assumes that all errors (E's) are set to zero at power-up, and that all $a$'s are 1 with no overlap at power-up.

The error can be converted into lightness space before being propagated. Lightness space uses values which are more linearly responsive to the perception of an observer than density or reflectance values. A lightness error at high lightness has an equivalent psychophysical meaning to the human observer as a lightness error does at low lightness. Thus, a linearized error is propagated which increases the dynamic range of the rendered data and makes tone reproduction by the system more accurate.

It should be understood that normally the propagated error is applied to a subsequent thresholding process for another dot to determine the level at which the subsequent dot will be rendered. In a binary system, this will be either full on or full off. The invention herein can be practiced, as in conventional error diffusion techniques, by using the propagated error in various ways to influence the thresholding process. This influence can be in the way of using the propagated error to change the value of the pixel information being subjected to the thresholding process. An alternative would be to increase or decrease the threshold reference level by an amount equal to the error. Any of these techniques may be used within the contemplation of the invention to perform the error corrected thresholding process. The important thing here is that the error propagated to other dots takes into consideration the overlap black areas of adjacent dots.

FIG. 8 is a block diagram of apparatus which may be used to perform the error diffusion technique taught by this invention. According to FIG. 8, a fixed threshold value is applied to the comparator 56 which performs the basic thresholding process to determine the level of the corresponding dot which is to be rendered at this location. The comparator 56 compares the threshold value with the pixel data which is derived from the pixel data value 58 and modified by the pixel value modifier 60 according to the diffused or propagated error from a previous operation.

The error produced at the comparator 56 is applied to the storage or delay system 62 so that it may be used during a subsequent thresholding process. Of course, the current operation makes use of a storage or delay of an error value produced in a previous thresholding operation. This previously determined value is applied to the error processor 64 which also has inputs corresponding to the dot overlap ratio 66 and the previous binary values of the rendered dots from memory 68. Memory 68 contains the levels determined by the comparator 56 for each of the dots thresholded by this system. Ultimately, the binary data in memory 68 is transferred to the print engine for rendering on the hard copy output used in the specific binary embodiment of this invention.

The error processor 64 first determines if either a horizontally or vertically adjacent dot is of a binary 1 value. If so, the dot overlap ratio 66 is used, according to equation (1), to apply a signal to the pixel value modifier 60. Thus, the pixel data value 58 is modified by the error from a previous thresholding operation before it is used by the comparator 56 to determine the level to be rendered for the current dot. This modification, according to this invention, is based upon a propagated error or a weighted portion of that propagated error, the dot overlap ratio between adjacent dots, and the status or binary level which was stored for the adjacent pixel. If either the horizontally or vertically adjacent dot is of a binary 0 value, the dot overlap ratio 66 corresponding to the binary 0 adjacent dot is not used to change the threshold value.

Figure 9:
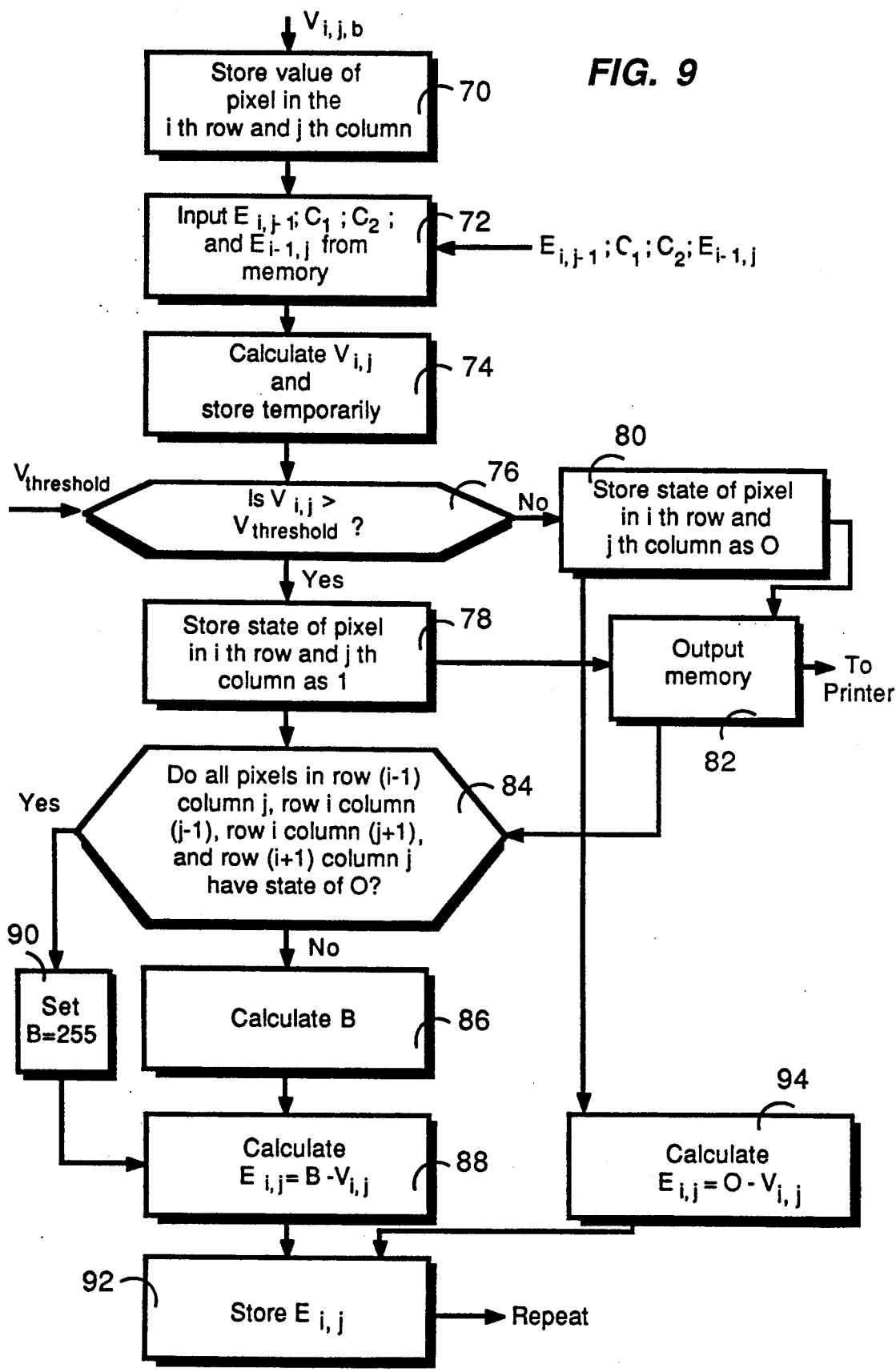
FIG. 9 is a flow chart of a software algorithm which can be used to implement the invention.

FIG. 9 is a flow chart of a software algorithm which may be used to implement the invention. According to step 70, the value of the pixel before any correction by propagated error is acquired and stored for future calculations. Next, the propagated error for the horizontally and vertically adjacent pixels and the percentage of overlap factors are obtained, as indicated in step 72. These values can be obtained from temporary storage in memory from previously calculated and determined quantities. According to step 74, the value of the dot is calculated with the obtained values according to equation (1). As indicated in step 76, the value obtained in step 74 is compared with a threshold value. If the calculated value is greater than the threshold, process flow is directed to step 78. If the calculated value is less than the threshold value, process flow is directed to step 80 where the binary level of 0 is stored in the output memory 82 for the pixel or dot at the i th row and j th column of the image. Eventually, the dot information in the output memory 82 is transferred to the printer for rendering on the hard-copy output medium.

When process flow is directed to step 78, a binary 1 is stored in the output memory 82 for the i th row and j th column of the image. When a binary 1 is stored, further processing must be undertaken to possibly modify the error signal or value which will be used in later calculations. According to step 84, it is determined if all of the pixels around the current pixel have a binary state of 0. Information from the output memory 82 is used in this calculation. If all of the pixels do not have a binary state of 0, process flow is directed to step 86 where B is calculated according to equation (4). Results of the calculation are passed on to step 88 where they are used to calculate the error according to equation (2). In the event step 84 determines that all of the pixels do have a state of 0, B is set to 255, as indicated in step 90, and this value is used in the calculations performed in step 88.

The values determined in step 88 are stored in memory as indicated by step 92. Step 92 also stores the error values calculated according to equation (3), as indicated in step 94. As indicated elsewhere herein, the error values may be converted into lightness space before they are stored and used in subsequent thresholding calculations to improve the linearity of the propagated error data. In such cases, the pixel value $V_{i,j,b}$ would be converted into lightness space before $V_{i,j}$ is calculated according to equation (1). The process is repeated for a new dot location by proceeding through the steps indicated in FIG. 9 for the new dot location.

The system taught by this invention provides an error diffusion technique which more precisely diffuses or propagates the error acquired during thresholding processes needed to convert pixel information at one number of discrete gray levels into rendered dot data at a lower number of discrete gray levels or at a binary level. With gray-level error diffusion, there are different degrees or amounts of dot overlap between adjacent dots. This method can also be extended to a uniform error color space, such as CIELAB or CIELUV, if color error diffusion is used.

It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. An error diffusion method for converting grayscale pixel information into binary data capable of being rendered by dots, which may overlap, each dot having one of two levels of density, said method including the steps of:

providing a fixed threshold value;

determining which level of density is to be rendered for a first dot, said determination being based upon a comparison of the fixed threshold value with a gray-scale value of pixel information corresponding to the first dot;

propagating, to an adjacent dot, at least a portion of any error between the determined density level of the first dot and the fixed threshold value;

modifying the propagated error based upon the amount of overlap between the first dot and the adjacent dot and upon the rendered level of the first dot;

using the modified error to adjust the gray-scale value of the pixel corresponding to the adjacent dot; and comparing the adjusted gray-scale value with the threshold value to determine which density level is to be rendered for the adjacent dot.

2. The error diffusion method of claim 1 wherein no modification is made to the propagated error when the first dot is rendered in the lower of the two density levels.

3. The error diffusion method of claim 1 wherein the modification to the propagated error is a function of the overlapped area to a complete area of the adjacent dot when the first dot is rendered in the higher of the two density levels.

4. The error diffusion method of claim 1 wherein the modified error is propagated in two directions to two adjacent dots, with the same modified error being used to establish the adjusted gray-scale value for each of the adjacent dots.

5. The error diffusion method of claim 4 wherein the modified error which is used to establish an adjusted gray-scale value for the adjacent dot is derived from the two dots partially overlapping the adjacent dot.

6. The error diffusion method of claim 1 wherein steps of the method are repeated so that all of the binary dots to be rendered from the gray-scale pixel information are thresholded using a modified propagation error which is based upon the amount of overlap between adjacent dots and the rendered level of the previous dot.

7. An error diffusion method for converting gray-scale pixel information into binary data capable of being rendered by dots, which may overlap, each dot having one of two levels of density, said method including the steps of:
   providing a fixed threshold value;
   determining which level of density is to be rendered for a first dot, said determination being based upon a comparison of the fixed threshold value with the gray-scale value of pixel information corresponding to the first dot;
   propagating, to at least two adjacent dots, at least a portion of any error between the determined density level of the first dot and the fixed threshold value;
   modifying the propagated error when the first dot is rendered in the higher of the two density levels, said modification being based upon the amount of overlap between the first dot and the corresponding adjacent dot;
   using the modified error to adjust the gray-scale of the pixel corresponding to the adjacent dots;
   comparing the adjusted gray-scale value with the threshold value to determine which density level is to be rendered for the adjacent dots; and
   repeating steps of the method so that all of the binary dots to be rendered from the gray-scale pixel information are thresholded using a modified propagation error which is based upon the amount of overlap between adjacent dots and the rendered level of the error propagating dot.

8. Apparatus for converting gray-scale pixel information into binary data capable of being rendered in binary dots which may overlap, each dot having one of two possible density levels, said apparatus comprising:
   means for thresholding the pixel information by comparing the information with a threshold value to determine which density level should be rendered by a dot corresponding to the pixel information;
   means for propagating any error produced during the thresholding process from a propagating dot to at least one adjacent dot; and
   means for affecting the thresholding process for an adjacent dot based at least partially upon the area overlap between the propagating and adjacent dots and the density level of the propagating dot.

9. The apparatus of claim 8 wherein the affecting means changes the threshold value when the propagating dot is rendered at the higher of the two density levels.

10. The apparatus of claim 9 wherein the threshold value is changed by an amount proportional to the amount of overlap and a total area of the adjacent dot.

11. The apparatus of claim 8 wherein the error is propagated in at least two directions to two adjacent dots.

12. The apparatus of claim 8 wherein the affecting means changes the gray-scale value for the adjacent dot.

13. The apparatus of claim 8 wherein the error is converted into lightness space before it is propagated.

14. The apparatus of claim 8 wherein the pixel information for the adjacent dot is converted into lightness space.

15. Apparatus for converting first gray-scale pixel information provided at a first number of discrete gray levels into second data at a second number of discrete gray levels capable of being rendered by dots which may overlap, the dots having densities according to the second number of discrete gray levels, said first number being greater than said second number, said apparatus comprising:
   means for thresholding the first pixel information by comparing this information with one or more threshold values to determine which density level should be rendered by a dot corresponding to this pixel information;
   means for propagating any error produced during the thresholding process from a propagating dot to at least one adjacent dot; and
   means for affecting the gray-scale value of the adjacent dot based at least partially upon the area overlap between the propagating and adjacent dots and the density level of the propagating dot.

16. The apparatus of claim 15 wherein the error is converted into lightness space to linearize the error.

17. The apparatus of claim 15 wherein the error is converted into uniform color space to linearize the error.

18. A method for converting the first gray-scale pixel information provided at a first number of discrete gray levels into second data at a second number of discrete gray levels capable of being rendered by dots which may overlap, the dots having densities according to the second number of discrete gray levels, said first number being greater than said second number, said method comprising:
   thresholding the first pixel information by comparing this information with one or more threshold values to determine which density level should be rendered by a dot corresponding to this pixel information;
   propagating any error produced during the thresholding process from a propagating dot to at least one adjacent dot; and
   affecting the gray-scale value of the adjacent dot based at least partially upon the area overlap between the propagating and adjacent dots and the density level of the propagating dot.

19. The method of claim 18 wherein the error is defined in terms of lightness space.

20. The method of claim 18 wherein the error is defined in terms of uniform color space.

* * * * *